(No Model.) 4 Sheets—Sheet 2.
O. P. BRIGGS.
AUTOMATIC SCREW MACHINE.
No. 514,441. Patented Feb. 13, 1894.
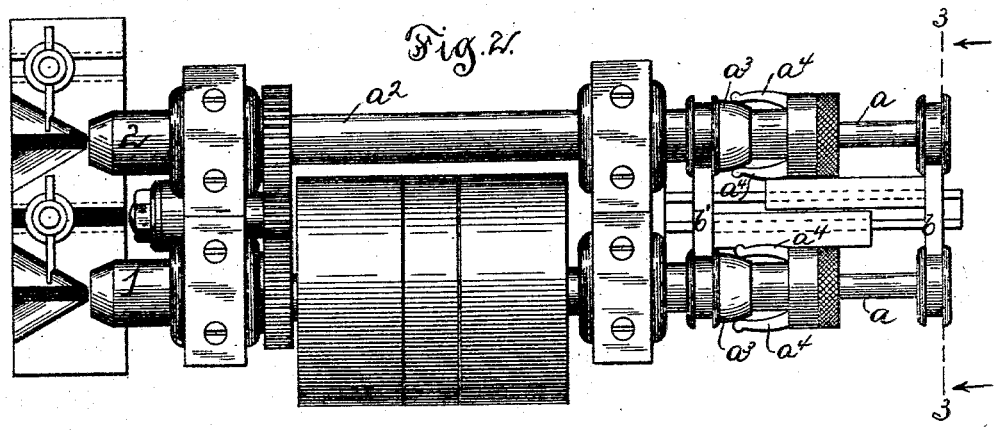
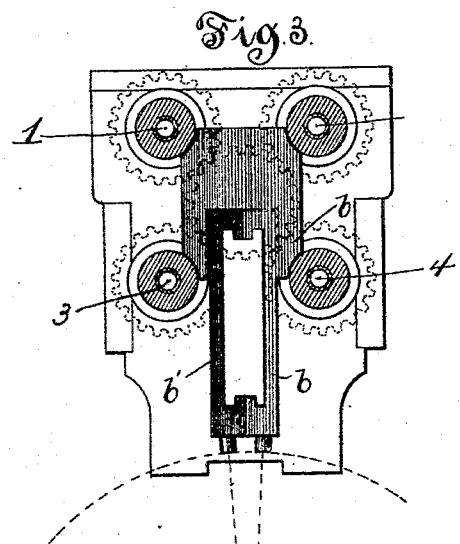
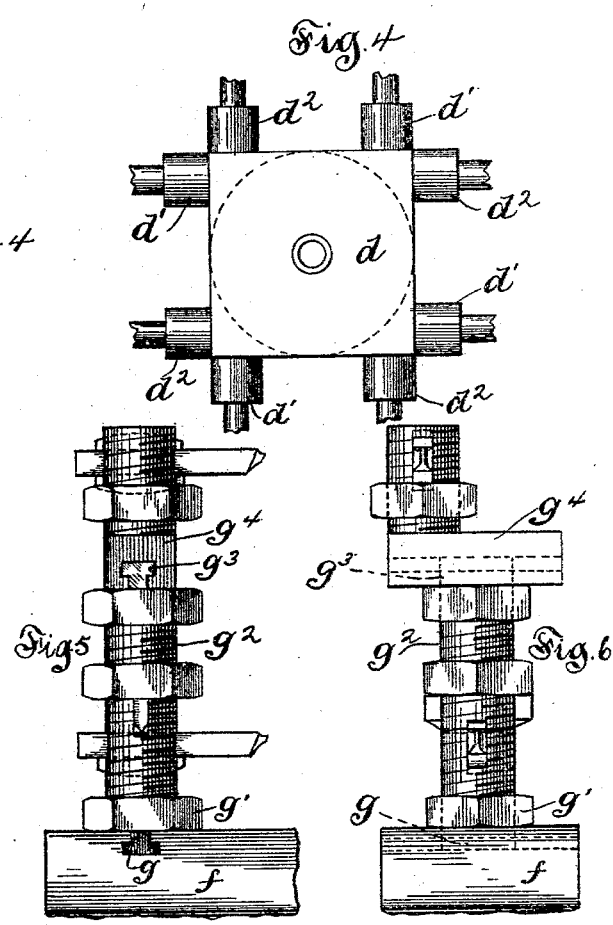
Witnesses:
Wm. M. Rheem.
George L. Cragg.
Inventor
Orlando P. Briggs
By Barton & Brown
Attys.

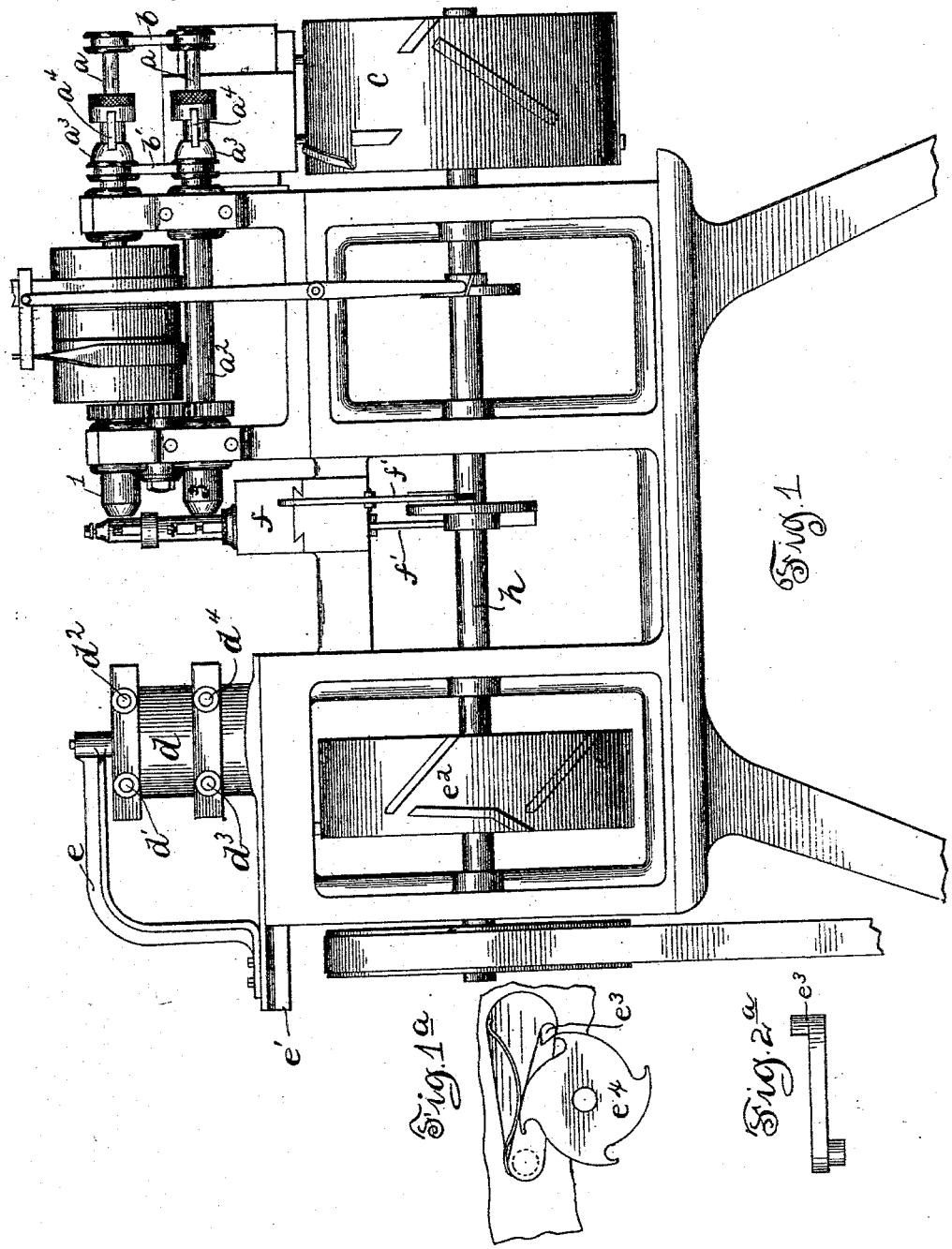

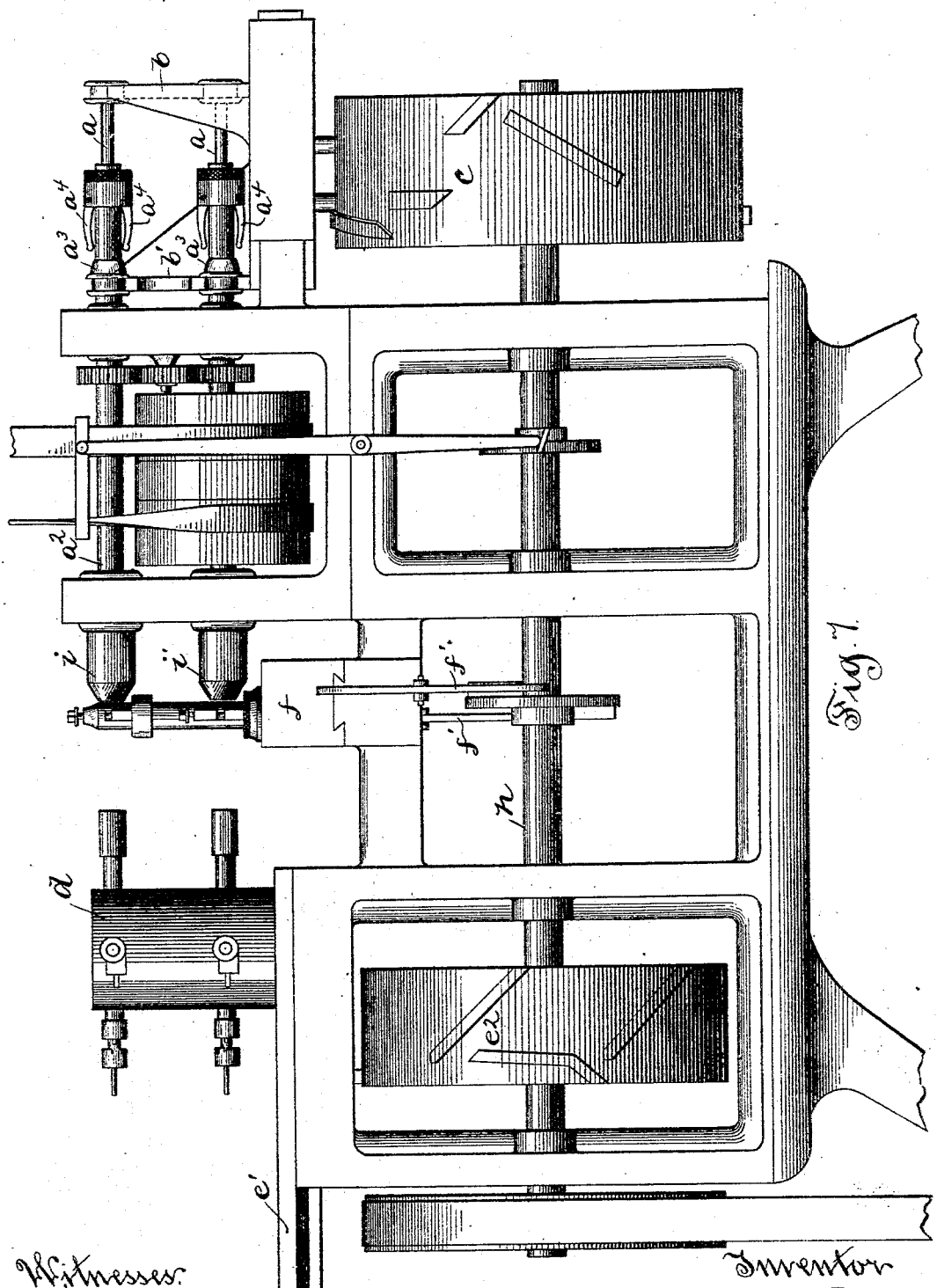

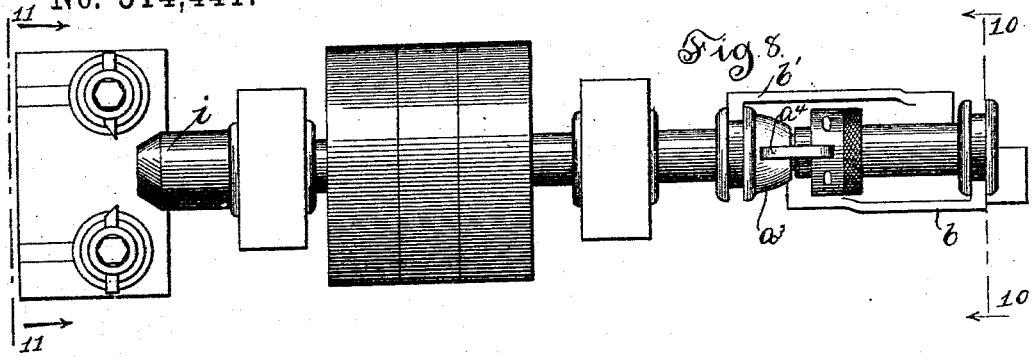
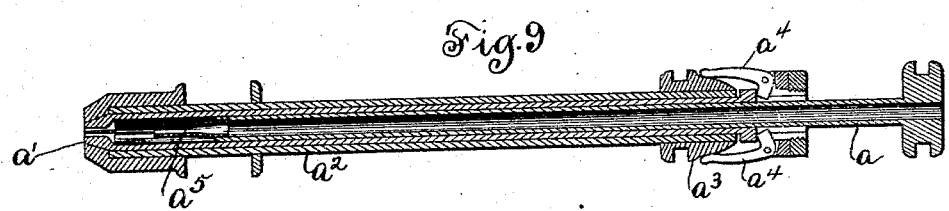
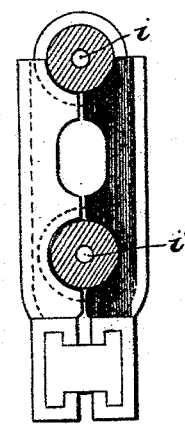
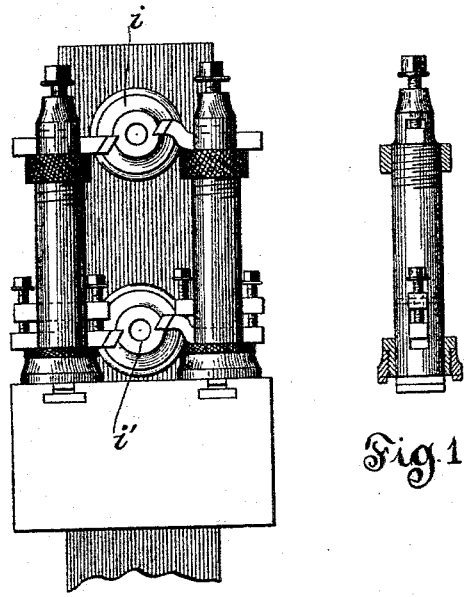

UNITED STATES PATENT OFFICE.

ORLANDO P. BRIGGS, OF CHICAGO, ILLINOIS.

AUTOMATIC SCREW-MACHINE.

SPECIFICATION forming part of Letters Patent No. 514,441, dated February 13, 1894.

Application filed May 23, 1892. Serial No. 434,101. (No model.)

*To all whom it may concern:*

Be it known that I, ORLANDO P. BRIGGS, a citizen of the United States, residing at Chicago, in the county of Cook and State of Illinois, have invented a certain new and useful Improvement in Automatic Screw-Machines, (Case No. 2,) of which the following is a full, clear, concise, and exact description, reference being had to the accompanying drawings, forming a part of this specification.

My invention relates to automatic screw machines, and its object, speaking generally, is to increase the capacity of such machines to do work.

Heretofore a single rod only at a time has been automatically fed into a given machine, this rod being advanced step by step as each screw, stud, or other piece of work, has been formed or partially formed and cut off.

So far as I am aware, no automatic machine provided with two or more spindles and sets of tools has been used capable of feeding at the same time two or more rods or pieces of stock, in combination with an automatically revolving turret provided with tools corresponding to the spindles.

The automatic screw machine heretofore used comprised a driving shaft carrying several cam wheels with cams thereon fitted to operate the different parts of the machine. The tools are carried on a revolving turret. This turret is brought up to the work, carried to the spindle and carried away from the same by one set of cams, and is rotated by mechanism similar to that used in hand machines. The spindle which carries the stock to be operated upon is hollow, and the stock is fed through this spindle as in the ordinary hand machine. A special set of cams provided on the main driving shaft has been used to operate the chuck which holds the rod in place, and the clamping sleeve which acts to move the rod forward when required. A third cam operates the cutting off tools, and still another set of cams shifts the belt which drives the spindle to reverse the direction thereof when required, as in tapping or threading.

In my application, Serial No. 428,548, filed April 9, 1892, I have described and claimed certain improvements in automatic screw machines, which relate more particularly to operating simultaneously on two or more pieces of work at the same time; the special feature of said application being the transfer mechanism whereby a piece of work partially finished is, when cut off, automatically transferred to a companion spindle to be finished. The machine illustrated and described in said application embodies two spindles which are used in connection with a revolving turret; said machine, however, as illustrated and described therein, is not adapted to work up simultaneously two pieces of stock, the companion spindle being adapted to receive a partially finished piece of work, but not adapted to feed the rod through the same.

I will now refer to some of the more special features of my invention herein.

First: Two plates, one of which I term the feed rod carrying plate, and the other of which I term the chuck operating plate, are adapted to act upon two or more spindles as the plates are actuated by cams upon the main cam wheel, to feed the stock simultaneously through each of the spindles; each carrying plate engages with similar parts of two or more spindles, the spindles being placed side by side, or one above the other.

Second: The turret is provided upon each of the working sides thereof with as many tool holders as there are spindles, and thus all the spindles may act together, each one working in unison with the others. Thus, upon each forward movement of the slide upon which the turret is mounted, the turret will revolve so as to present a separate tool to each of the spindles; that is to present as many tools to the spindles as there are spindles.

Third: The tool posts mounted upon the sliding block are made adjustable longitudinally with respect to one another, and the spindles, so that the cutting off tools may be adjusted from time to time, as required.

Fourth: In case four spindles are employed, they are preferably placed side by side in pairs, so that the axes of each pair will be at the same distance radially from the axis of the main driving shaft. Four spindles are thus conveniently driven together by an idler which meshes with pinions upon the spindles.

My invention is illustrated in the accompanying drawings, in which—

Figure 1 is a side elevation of a machine adapted to work up four rods at a time. Fig. 2 is a plan view thereof. Fig. 3 is an end view as seen from line 3—3 of Fig. 2. Fig. 4 is a plan view of the revolving turret with tools inserted in the tool holders, the tools being broken away. Figs. 5 and 6 illustrate the manner of adjusting the tool posts and the tools for each upper and lower spindle. Fig. 7 is a side elevation of a modification of my screw machine adapted to work upon two rods at a time. Fig. 8 is a plan view of the upper portion of the machine shown in Fig. 7, except the turret. Fig. 9 is a detail sectional view of one of the spindles. Fig. 10 is an end view taken on line 10—10 of Fig. 8. Fig. 11 is an elevation taken on line 11—11 of Fig. 8. Fig. 12 is a side view of the tool post. Fig. 1$^a$ is a top view of the cam wheel on the bottom of the turret and the pawl mounted on the bed of the machine adapted to engage therewith and rotate the same. Fig. 2$^a$ is a side elevation of the pawl.

Like parts are indicated by similar letters and numerals of reference throughout the different figures.

The spindle, as shown in Fig. 9, is of well known construction. The rod is inserted in the feed sleeve $a$, so that its inner end may be grasped by the chuck $a'$. The shaft $a^2$ has been driven usually by means of a belt passing over a pulley provided thereon. The collar $a^3$ is adapted to be moved longitudinally upon the shaft $a^2$ to force its conical side under the levers $a^4$ $a^4$, which are thus brought against the intermediate sleeve which carries the chuck $a'$ to force the jaws of the chuck together to clamp the rod when placed in the well known way. The feed carrying sleeve $a$ is provided with springs $a^5$ which are adapted to press upon the rod with sufficient friction so that the rod may be carried thereby when the chuck $a'$ is open. When the rod is clamped by the chuck, the springs $a^5$ may slide back over the rod to be in position to carry the rod forward when the clutch is again opened. I provide preferably four such spindles in connection with two plates $b$ and $b'$. The plate $b$ is adapted to move simultaneously with the feed carrying sleeves $a$ of each of the four spindles. In like manner the plate $b'$ is adapted, by means of the sliding collars $a^3$ and the bell crank levers $a^4$, to operate simultaneously the chucks $a'$ of each of the four spindles. Thus suppose rods inserted one in each of the spindles, so as to be clamped by the chucks respectively. It is evident that by operating the plates $b$ and $b'$ in proper relation to the work that is being performed, the rods may all be advanced step by step together, so that as a piece of work is finished and cut off from each rod, additional stock may be brought in position to be operated upon. The movement of the plates $b$ $b'$ is thus effected by means of cams provided upon the cam wheel $c$, as shown.

The turret $d$, as shown most clearly in Figs. 1 and 4, is provided on each of the four faces thereof with four tool holders $d'$ $d^2$ $d^3$ $d^4$, which correspond respectively to the spindles 1, 2, 3 and 4. The turret is preferably braced by the bracket $e$, as shown in Fig. 1; this being desirable, if not absolutely necessary in order that it may be secured against any tendency it might otherwise have to spring away from the work. This turret is provided with a ratchet wheel on the under side thereof to rotate the same to bring one set of tools after the other, opposite the work carried by the spindles. Thus as the slide $e'$, carrying the turret, is reciprocated back and forth by the cams upon the cam wheel $e^2$, the dog $e^3$ will engage with the ratchet wheel $e^4$ to rotate the turret in a manner well understood.

Each post of the cutting off tools is preferably of the construction shown in Figs. 5 and 6. The block $f$ is adapted to be reciprocated transversely by the cam levers $f'$ in a well known way. Base $g$ of the post may be T-shaped to correspond with a groove provided in the sliding block $f$. By loosening the jam nut $g'$, the post may be moved toward and away from the spindles, and then by tightening the nut $g'$, secured in place. The lower portion $g^2$ of the post is provided with a T-piece $g^3$, which corresponds with a groove provided in the base of the upper half or portion $g^4$ of the post; thus the two portions $g^2$ $g^4$ of the post are made independently adjustable toward and away from their respective spindles.

It will be observed that the upper pair of spindles 1, and 2, are placed side by side so that the axis of each will be at the same distance radially from the main driving shaft $h$. In like manner the spindles 3 and 4 have their axes respectively the same distance from said driving shaft.

As shown in Figs. 7, 8, 10 and 11, the spindles $i$ $i'$ are placed one above the other. In case two spindles only are used and placed one above the other in the manner shown, my machine may be readily adapted, by adding the transfer mechanism of my previous application, and modifying the upper spindle as a companion spindle, to operate upon two pieces of work at the same time, after the manner described in my said previous application.

My invention admits of other modifications that would readily suggest themselves to those skilled in the art, and I therefore do not limit myself to the details of construction shown.

Having thus described my invention, I claim as new and desire to secure by Letters Patent—

1. The combination with two or more spindles, each provided with a separate chuck and a separate feeding device, of means for rotating said spindles, a single cam actuated mechanism adapted to simultaneously operate the several chucks, and a second single cam actuated mechanism adapted to simultaneously operate the several feeding devices, substantially as described.

2. In a screw machine, the combination with the main driving shaft, of four spindles driven together in the same direction, cutting off tools mounted upon adjustable tool posts, and a revolving turret carrying sets of tools on the different faces of said turret, two plates operated by the cams upon a cam wheel, which is provided on the shaft to cause the spindles to simultaneously feed the work, a cam wheel upon the same shaft for moving the turret longitudinally and rotating the same, and cam lever mechanism for reciprocating the posts carrying the cutting off tools transversely, substantially as described.

3. In a screw machine, the combination with duplicate spindles one above the other, of an adjustable post carrying cutting off tools adjustably mounted thereon, said post as a whole being adjustable toward and away from the spindles, means for adjusting the upper and the lower portions of the post with respect to one another toward and away from the spindles, and cutting off tools passing through slots provided in each of said portions; whereby the tools of each spindle may be independently adjusted, substantially as described.

4. In a screw machine, the combination, with two spindles, one above the other, of a post for carrying the cutting off tools, said post consisting of two parts, a tool being supported in each of said parts, and said parts being each independently adjustable toward and away from the spindles, substantially as specified.

5. In a screw machine, the combination with two or more spindles arranged one above another and means adapted to feed forward the stock to be operated upon, of a turret adapted to rotate about a vertical axis and carrying sets of tools lying respectively in the planes of said spindles, cutting off tools for each of said spindles, and cam actuated mechanism adapted to feed forward the stock in the several spindles, rotate the turret and actuate the cutting off tools in proper sequence, substantially as described.

6. In a screw machine, the combination with two spindles, one above the other, of a post for carrying the cutting off tools, said post consisting of two parts movable transversely and independently of one another, each of said posts supporting the cutting off tools for one of the spindles, substantially as described.

7. In a tool post, the combination with a lower portion adapted to support a tool and adjustable at right angles to its length, of an upper portion carried upon said lower portion, said upper portion being adapted to support a tool and movable at right angles to its length independently of the lower portion, substantially as described.

8. The combination with two or more rotating spindles provided with chucking devices, of a single cam actuated mechanism adapted to engage with and actuate all of said chucking devices, a revolving turret provided with a set of tools opposite each of said spindles, a cam actuated mechanism adapted to engage and periodically rotate said turret, and controlling cams adapted to operate said cam actuated mechanisms, substantially as described.

9. The combination with two or more spindles, each provided with a separate chuck, of means for rotating said spindles in unison, and a single cam actuated mechanism adapted to simultaneously operate the chucks of the said spindles, substantially as described.

10. The combination with the parallel rotating spindles, of the chucking devices, one for each spindle, carrying the collars $a^3$, the cam actuated mechanism provided with the plate $b'$ adapted to engage the collars of the several spindles, the feeding devices, one for each of said spindles, provided with sleeves $a$, the cam actuated mechanism provided with the plate $b$ adapted to engage all of said sleeves, and the cam actuated revolving turret $d$ provided with a set of tools opposite each of said spindles, substantially as described.

11. The combination with two or more rotating spindles, provided with chucking jaws, the jaws of the several spindles being adapted to be closed in unison, of a longitudinally movable sleeve provided in connection with each of said spindles adapted, when moved longitudinally, to operate said jaws, and a single cam actuated mechanism adapted to engage the sleeves of the several spindles to move the same simultaneously, whereby the chucking jaws are opened and closed in unison, substantially as described.

In witness whereof I hereunto subscribe my name this 11th day of May, A. D. 1892.

ORLANDO P. BRIGGS.

Witnesses:
CHARLES A. BROWN,
GEORGE L. CRAGG.